US006293147B1

(12) United States Patent
Parker et al.

(10) Patent No.: US 6,293,147 B1
(45) Date of Patent: Sep. 25, 2001

(54) WHEEL BALANCER WITH PRESSURE ADJUSTMENT

(75) Inventors: Paul Daniel Parker, Kirkwood; Nicholas J. Colarelli, III, Creve; Michael W. Douglas, St. Peters, all of MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/471,834

(22) Filed: Dec. 23, 1999

(51) Int. Cl.$^7$ ..................................................... G01M 1/16
(52) U.S. Cl. .................. 73/462; 700/279; 340/870.16; 73/146.3; 73/146.4; 73/146.5
(58) Field of Search ............................. 73/462, 487, 146.2, 73/146.3, 146.4, 146.5, 460; 340/442, 445, 447, 449, 614, 870.16, 870.17; 116/34 R; 700/275, 279

(56) References Cited

U.S. PATENT DOCUMENTS

| 4,958,290 | * | 9/1990 | Kendall et al. | 364/463 |
| 5,297,424 | * | 3/1994 | Sackett | 73/146.5 |
| 5,355,729 | | 10/1994 | Douglas | 73/468 |
| 5,396,436 | * | 3/1995 | Parker et al. | 364/508 |
| 5,429,166 | | 7/1995 | Anzai et al. | 152/415 |
| 5,611,875 | | 3/1997 | Bachhuber | 152/415 |
| 5,891,277 | | 4/1999 | Bachhuber | 152/415 |
| 5,915,274 | | 6/1999 | Douglas | 73/462 |
| 6,034,596 | * | 3/2000 | Smith et al. | 340/447 |

* cited by examiner

Primary Examiner—Richard A. Moller
(74) Attorney, Agent, or Firm—Thompson Coburn LLP

(57) ABSTRACT

A wheel balancing system for the reduction of vehicle wheel and pneumatic tire assembly vibrations with the capacity to determine and selectively adjust the pneumatic tire's pressure simultaneously with wheel balancing. The balancing system includes a drive for rotating the tire and wheel assembly; a sensing system for the selective determination of vibration causation and correction information; a pneumatic system for the adjustment of the pneumatic tire's pressure; a control system for instituting the determined vibration corrections and pressure adjustments; as well as a communication system for receiving, transmitting and presenting data or instructions. The sensing system is responsive to the wheel balancing systems operational status, the wheel and tire assembly's operational status, wireless or network communications and input from the user. The control system includes automatic provisions for safety, convenience, time efficiency, balancing and pressure adjustment. The pneumatic system, under direction of the control system, institutes an automatic adjustment of the tire's pressure; and the communication system includes notification and display provisions.

66 Claims, 3 Drawing Sheets

WHEEL BALANCER WITH PRESSURE ADJUSTMENT

FIELD OF THE INVENTION

This invention relates to wheel balancers with the capability of monitoring and setting pneumatic tire pressure.

BACKGROUND OF THE INVENTION

Wheel balancers reduce operational vibrations of vehicular tire and wheel assemblies by the calibrated placement of correction weights. An example of such a wheel balancer is the Hunter GSP 9700 Vibration Control System; for which the Operation Instructions, Software Version 1.3, Form 4202T, O7-99© Copyright 1997 Hunter Engineering Company, is expressly incorporated herein by reference. Referring to Section 5 of the GSP 9700 Operating Instructions, vibrations in tire and wheel assemblies can be caused by: imbalance; non-uniform sidewall stiffness (force variation); bent or out-of-round rims; out-of-round tires and combinations thereof. The theory, analysis and correction of these factors with wheel balancers and the GSP 9700 in particular is described in the afore cited GSP 9700 Operating Instructions.

As described in a note of emphasis from Sect 2.2 OEM-Matching™ of the GSP 9700 Instructions: "It is important that the air pressure of the tire is set to specifications prior to the Road Force Measurement™. Incorrect tire pressure will affect the results." It is also well known in the art that extreme tire pressure errors can cause imbalance measurement errors. Most importantly, tires which are either over inflated or under inflated are likely to have premature failures resulting in possibly serious injuries.

Accomplishing pneumatic vehicle tire vibration reduction with a wheel balancer thus requires an accurate tire inflation pressure. To accomplish this during a balancing procedure introduces challenges: The optimization of pressure for the characteristics of the tire, vehicle, environmental conditions and operational circumstances may require frequent or exacting adjustments. The wide range of tire sizes and variations in construction stiffness make it difficult during a balancing procedure to prejudge how long to fill or release gas to reach a desired pressure, thereby involving costly time investments for precision.

Some common automatic pressure adjustment systems use mechanical valving/setting devices. Because the pressure reading instrument used by such devices is not located in the tire but rather upstream in the relatively restricted passages of the filling apparatus, a correct pressure reading can not be made during the actual filling. Hence, gas filling is performed in pulses to allow pressure reading between pulses. These systems operate by brute force trial and error without provision to compensate for differing degrees of mispressurization and are hence time wasting. The inability to improve efficiency by not learning from prior attempts or adjusting for differing tire volumes and stiffnesses can impose further delays. The mechanical nature of these devices also causes a substantial increase in the amount of time between fill stages as the tire pressure approaches the dialed in pressure. Finally, the accuracy of such systems is typically marginal, requiring continuous rechecking with a separate gauge.

Some prior art computer controlled pressure adjustment systems incorrectly assume a constant, linear relationship between the gasflow rate and the tire's physical characteristics. The tire's rate of pressurization vs. gasflow rate can vary, depending on the tire's pressure at a given moment. Such systems also assume constant gas supply pressure. Within a vehicle service center there are often multiple demands being put on a compressed gas supply system simultaneously. A computer controlled system can be greatly slowed in setting the pressure or inhibited from doing so accurately without the capacity to account for these changing conditions.

SUMMARY OF THE INVENTION

The present invention provides for a wheel balancer with an integrated, time-efficient, attention sparing system for the automatic, accurate gas pressurization of pneumatic vehicle tires that are being balanced. The system may include in combination with the wheel balancing apparatus a pneumatic device, an electronic computer in control of the pneumatic device and a graphic display interface also in connection with the computer. The interface serves to show the current pressure reading, the target pressure reading, the mode of operation, whether the pressure is unstable and the user's input.

The pneumatic device includes a connecting passage for a governed flow of gas, a source of pressurized gas, a pressure transducer, one or more exhaust ports and an attachment that connects to and opens a pneumatic tire valve stem. The pressure source, exhaust ports, and tire valve connection are connected to the gas flow through the passage by one or more governors, such as valves, which are selectively operated under the computer's direction. The governors may operate individually or in various combinations, as well as allow bidirectional, unidirectional or prevent gas flow. The governors all normally operate under the computer's direction, except for safety provisions in advent of a power failure to allow for the venting of potentially dangerous pressures.

The present invention can utilize the graphic interface, in one variation a CRT, to provide the user with ongoing measurement results, input control settings and current status in a single image to enhance comprehension speed and control ease. The graphic interface may be selected to appear immediately upon attachment of the device to the tire valve or after a flexibly chosen delay following removal of the tire valve attachment from its home storage position, thereby eliminating another demand on the user's attention. The interface can also selectively depict pressure in U.S. or International units, thus removing unnecessary visual clutter while still maintaining flexibility of worldwide utility.

The electronic computer enables the invention to quickly correct the tire pressure without user attention. Among the computer program's features are a "hands-off" control process where merely attaching the pneumatic system to the tire valve triggers the system to automatically determine if the pressure is correct and, if not, determine if the tire requires inflation or deflation and initiate the appropriate correction procedure. Additionally, the program accomplishes the pressure adjustment by a learning algorithm that can account for the current measured pressure, the target pressure, system criteria, pressurization history, the tire's gas temperature and available individual vehicle and wheel data to minimize the pressure adjustment time.

A nearby tire changer, for example, may cause a momentary source pressure drop to where a resulting next filling pulse duration is too long, or a pressure source compressor shutoff in filling mid-pulse will cause an irregularly increasing gas supply pressure and thus a first pulse overshooting the pressure target. Continuous learning by adjustment of the fill interval after each pulse allows real time adaptation to fluctuating pressure sources. The system learns from misses and typically hits the pressure target accurately on the next interval.

The learning capacity also compensates for nonlinear fill or deflation characteristics of the tire and the gas components. Most notably, when filling from a low tire pressure, most tire designs cause tire pressure rates of increase, with a constant source pressure, that are less than when the tire body is stretched by the tire's higher internal pressure. To make an assumption of a constant fill interval in these cases, therefore, would cause an error on the high side and likely cause the fill pulse to overshoot the desired pressure. At pressures near tire manufacturer ratings, most tires cause pressure to increase linearly with input gas flow rate as the tire behaves akin to a rigid vessel, and compensation is rarely required. However, the learning algorithm is still applied in event of unanticipated tire designs and particularly, to adjust for possible error in a long previous interval involving a large tire pressure change. Additionally recent "runflat" tires do not exhibit the nonlinear fill characteristics described above. Producing the runflat capability requires a construction so inflexible that they behave like rigid vessels irregardless of tire pressure, and are thus essentially linear in their ratio of internal pressure increase to input/output gas flow even at low to zero internal tire pressure. Any assumption made by an initial "fixed" interval calculation that is adjusted for common tires' nonlinear fill characteristics would be in error with these runflat tires, hence the utility of the learning algorithm for accomplishing automatically the quickest, most accurate tire pressure during a wheel balancing procedure.

One embodiment of the invention combines a wheel balancer apparatus with a tire pressure adjustment system. Operational features of the wheel balancer are combined with and utilized to facilitate aspects of the pressure adjustment system. Another variation of the invention uses a wheel balancer apparatus in combination with a pressure regulation apparatus to effect the adjustment of the tire pressure. This second variation may also involve the employment of a tire changing apparatus either separately from the wheel balancer or as a single device which combines the functions of a wheel balancer and tire changer. Another embodiment of the invention allows a wheel balancer apparatus to automatically recognize the pressure status of a tire and wheel assembly whether or not initially in a pressurization mode. A final embodiment of the invention provides the capability of recognizing tire assembly parameters by communication with a sensor that is not permanently linked to the balancer, such as pressure and temperature sensors with transmitter/receivers located onboard the tire and wheel assembly; or where the remote data source is on the vehicle separate from the tire and wheel assembly; the means of communication including wireless, network communication or transfer of stored data.

A first object of the present invention is to provide a vehicle wheel balancer with the ability to read and adjust pneumatic tire pressures.

A second object of the present invention is to speed the accurate adjusting of the pneumatic tire pressure when wheel balancing.

A third object of the present invention is to accomplish an accurate pneumatic tire pressure when wheel balancing without user supervision.

A fourth object of the present invention is to integrate a tire pressurization control and measurement system into a wheel balancing control and measurement system.

A fifth object of the present invention is to automatically determine whether a pneumatic tire's pressure is above or below a desired pressure when wheel balancing.

A sixth object of the present invention is when wheel balancing to automatically execute the appropriate pressure correction procedure upon determination of an incorrect tire pressure.

A seventh object of the present invention is to provide a wheel balancer with a pressure recognition and control system providing the ability to receive pressure information by direct or indirect linkage.

An eighth object of the invention is to insure the pressure is checked whenever a wheel is balanced to prevent improperly inflated tires possibly contributing to driving accidents.

Other objects and features will be in part apparent and in part pointed out hereinafter.

DETAILED DESCRIPTION OF THE PREFERRED EMBODIMENTS

Figure 1:
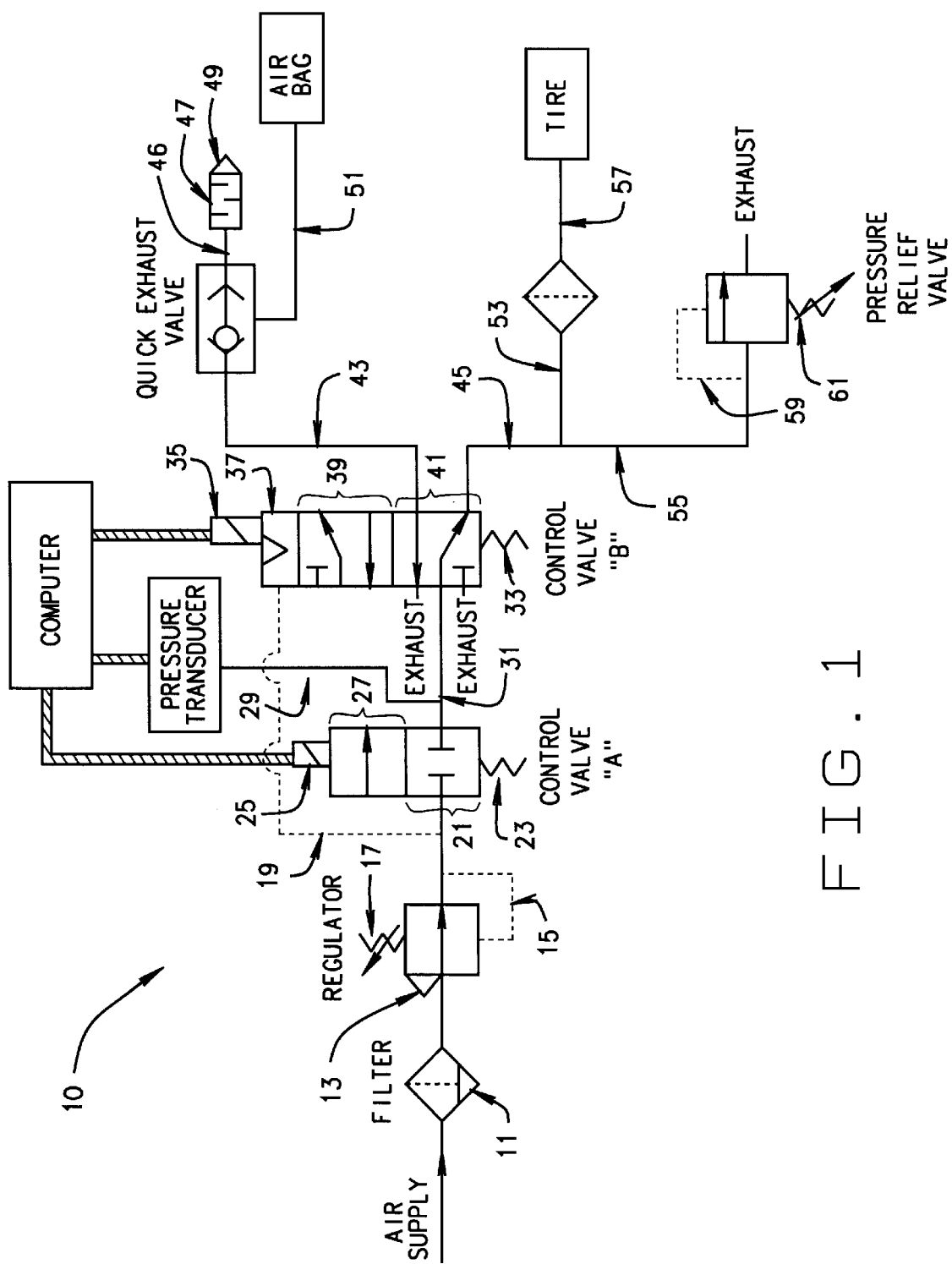
FIG. 1 is a schematic diagram of the gasflow control system used in the present invention.

Turning to the drawings, FIG. 1 illustrates the operational elements and control devices of the gas, in this instance air, flow system 10 used for the present invention. Single solid lines represent connecting air passages for the various elements of the system, dashed lines represent pilot lines for the air pressure induced control of the equipment they connect to or are contained within and the double shaded lines represent electrical connections to and from the computer. The symbols depicted are substantially standard representations for various fluid and gas components as decided by the American National Standards Institute (ANSI). Starting from the left of FIG. 1, The air supply from an outside source enters the system initially at the filter which includes a drain 11 for the release of water. From the filter the air flow passes to the regulator which controls and maintains the pressure passing through to the right. The regulator contains a vent 13, an internal control pilot line 15 which feeds back to the regulator the pressure level in the passage to the right of the regulator and a variable spring 17 for the selectable determination of the pressure level that the regulator passes through to the right. The regulated airflow then continues towards control valve A. Control valve A has two operational control elements, which act alternatively: clement 21, depicted in operation, prevents the flow of air to the right of control valve A. and clement 27, depicted out of operation, allows the flow of air to the right when in operation. Spring 23 normally forces control valve A so that element 21 is in operation. Solenoid 25, when under direction from the computer, forces control valve A, in opposition to spring 23, to switch element 27 into operation. The airflow line passing to the right from control valve A branches in two, line 29 passing airflow to a pressure transducer, preferably a Motorola MPX5700CGP, and line 31 passing airflow to control valve B which has two alternating operational control elements: element 41, depicted in operation, and element 39, depicted out of operation. Spring 33, when unopposed, exerts a force on control valve B so that clement 41 is in operation. Control valve B includes a solenoid 35 that, under direction from the computer, opens the pilot control valve 37. When open, the pilot valve 37 enables the air control line 19 to exert force in opposition to spring 33 thereby switching element 41 out of operation and element 39 into operation. When in operation clement 41 passes the airflow from line 31 through to line 45, and passes any right to left airflow from line 43 to an exhaust. Element 39, when in operation, passes airflow from line 31 through to line 43, and passes any right to left airflow from line 45 through to an exhaust. Line 43 passes airflow to a quick exhaust valve acting as a shuttle valve mechanism. Airflow line 46 passes to the right from past the shuttle valve to a muffler 47 and a vent 49. Airflow line 51 connects to the shuttle valve air passage at a point between the right and left checks and passes on to an air bag. Airflow line 45 passes to the right from control valve B and branches into two airflow lines: line 53 and line 55. Line 53 passes to a filter and on to a connection 57 to a pneumatic tire's inflation valve (not depicted). Line 55 passes to a pressure relief valve. The pressure relief valve is forced by selectably variable spring 61 not to be open to the passage of airflow from left to right to the exhaust. When the pressure in line 55 becomes greater than the selected level air control line 59 moves the valve so that it does open for airflow from line 55 through to an exhaust. The quick exhaust valve functions as a shuttle valve which air flow can pass through in one of two alternate ways. If the pressure in line 43 is low relative to the pressure in line 51 then the shuttle valve is as depicted with airflow essentially blocked from line 51 to the left through line 43, a configuration designated here as open-right. When open-right, air flows through line 51 from an air bag and then passes through the shuttle valve to line 46 through a muffler 47 and out a vent 49. If the pressure in line 51 is low relative to the pressure in line 43 then the shuttle valve ball is pushed to the opposite catch thereby essentially blocking airflow to line 46 a configuration designated here as open-left. When open-left air flows from line 43 through the shuttle valve and on to inflate the air bag. The shuttle valve has a moderate predisposition towards the open-right configuration such that the shuttle valve ball is in the open-left position primarily when there is a substantial pressure difference of line 43 over line 51. The tire is inflated as part of the pressurization procedure the invention is in part intended to accomplish. Controlled airflow to the air bag is utilized as a part of a load roller mechanism employed for road force measurement on the Hunter GSP9700 (not depicted). This pneumatic arrangement has four states of operation, characterized by the switched on vs. switched off status of the solenoids in the control valves, described hereafter as solenoid A and solenoid B. In state I, depicted in FIG. 1, solenoids A and B are both switched off and thus elements 21 of valve A and 41 of valve B are in operation. In state II solenoid A is off and B is on; in state III both are on; and in state IV A is on and B is off. Hence in state I the air supply to the system from the regulator is blocked, the air in the air bag is exhausted through the muffler 47 and the vent 49. The air flow system has an open passage from the tire to the pressure transducer allowing the tire pressure to be registered by the transducer in state I. In state II the control valve A is off thereby blocking the pressure supply from the rest of the system. Control valve B is on thereby bringing element 39 into operation so that the tire is exhausted and an open passage between the pressure transducer and the air bag allows the air bag pressure to be read. In state III control valve A is open thus connecting the air supply to the air flow system; and element 39 of control valve B is in operation thus exhausting the tire and opening the air flow system to inflate the air bag.

In state IV control valve A is open thus connecting the air supply to the air flow system; and element 41 of control valve B is in operation thus exhausting the air bag and opening the air flow system to inflate the tire.

Figure 2:
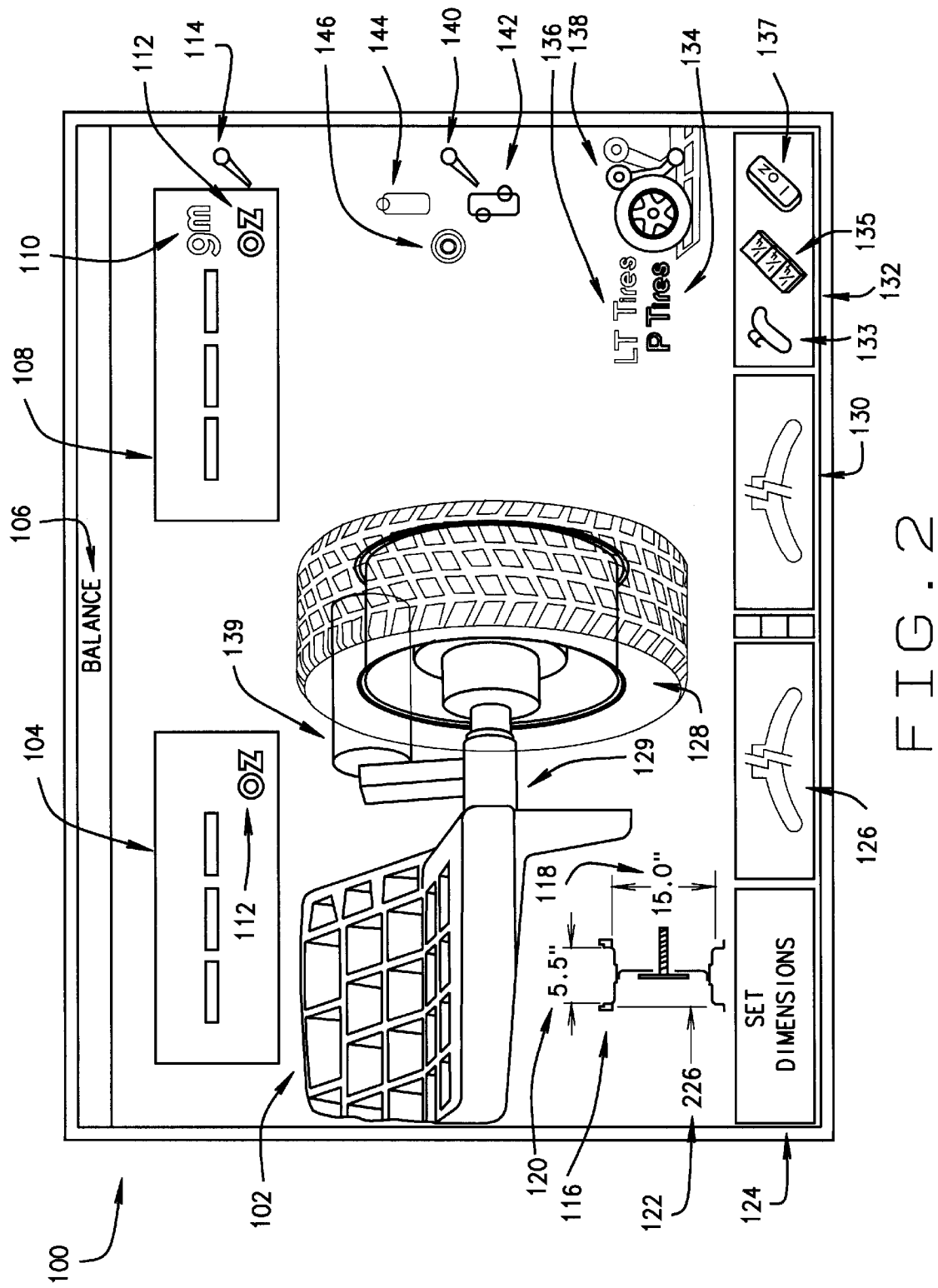
FIG. 2 is a view of the wheel balancer graphic display when in balancing mode.

FIG. 2 illustrates the graphic display 100 in a balance mode. The graphic display 100 operates under the direction of, provides input to and shows output from the computer of FIG. 1 (refer to the section 2 of the afore cited GSP 9700 Operating Instructions for detailed explanations). A header 106 at the top-center of the display indicates the balance mode. A schematic representation of the vehicle frame 102, the vehicle axle 129 and the vehicle wheel and tire assembly 128 occupies the center and middle left of the display. A determined left plane imbalance compensation weight is shown in box 104 as well as a highlighted (as depicted) ounce unit of measurement indicator 112. A determined right plane imbalance compensation weight is shown in box 108 as well as a highlighted (as depicted) ounce unit of measurement indicator 112. When grams are selected both indicators 112 are not highlighted and the single gram indicator 110 in 108 is highlighted. Toggle indicator 114 represents the selector control (not depicted) for the choice of units. Diagram 116 is a cross-sectional view of wheel rim dimensions and balance information. Indice 122 (depicted as the number 226) is a measure of the distance from a reference point on the balancer to an inboard balance weight placement plane in the axial direction. Indice 120 is the width of the wheel rim and indicate 118 is the diameter between the tire bead seats. Box 124 indicates the inputting of wheel and tire dimensions when highlighted (as depicted). Boxes 126 and 130 indicate a split arrangement of balance weights in the left and right balance planes, respectively, when either is highlighted (neither highlighted as depicted). Box 132 indicates the selection of balance weight types: clip to rim weight 133, adhesive fractional weights 135 and an adhesive tire interior weight 137. Term 134 indicates passenger type tires are being balanced when highlighted (as depicted) and term 135 indicates the balancing of light truck tires when highlighted. Symbol 138 denotes whether the load roller 139 operation is enabled (as depicted) or disabled. Toggle 140 shows the selection of either a two weight plane balance indicator 142 (depicted as selected) or a single weight plane balance indicator 144. Either 142 or 144 can be selected in combination with target symbol 146 (depicted as not selected) to cause displays 104 and 108 to display weight amounts to fine resolution and without increment rounding.

Figure 3:
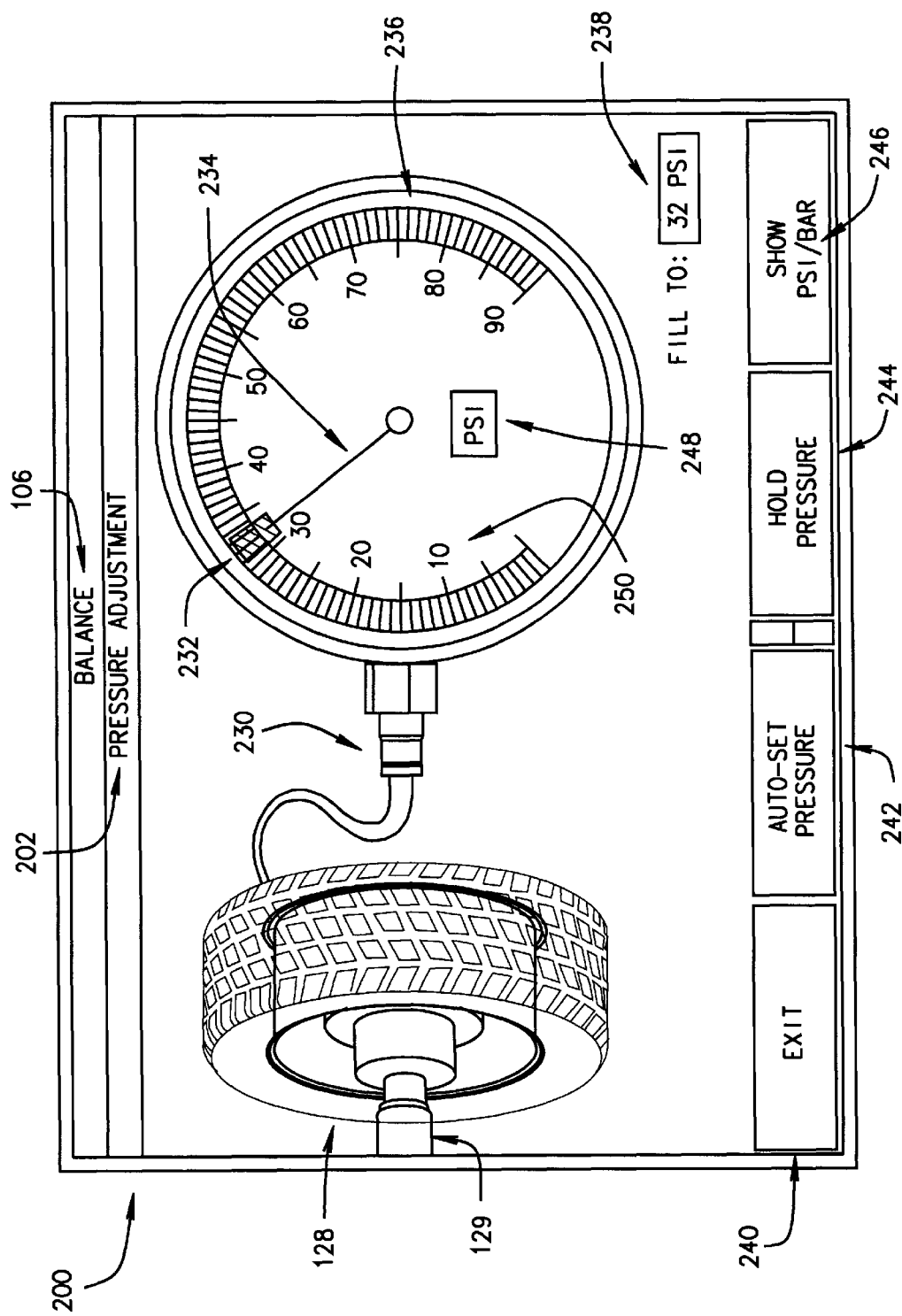
FIG. 3 is a view of the wheel balancer graphic display when in pressurization mode.

FIG. 3 illustrates the graphic display 200 in the pressure mode. The graphic display 200 operates under the direction of, provides input to and shows output from the computer of FIG. 1. A sub-header 202 at the top center of the display indicates the balancer is in pressure adjustment mode. The vehicle axis representation 129 and the vehicle wheel and tire assembly representation 128 are in the center left of the display. A schematic representation of an inflation connection 230 connects to a pressure gauge representation 236. The pressure indicator 234 rotates about the gauge 236 during the measurement and adjustment phases of operation until when it lies within the target pressure reference interval 232 (as depicted). Box 238 displays numerically the target pressure and choice of units provided. Box 240 indicates the choice of leaving the pressure adjustment mode, box 242 the choice of being in the pressure adjustment mode and box 244 the choice of being in a hold mode when no further pressure change is desired. Box 246 indicates a selectable choice between English and international unit standards. Box 248 indicates the units for the digits 250 displayed on the gauge representation 236. The pressure transducer is located upstream in the gas flow system, not the tire; and the pressure reading is accurate only when the actual pressure adjusting is paused. Hence the adjusting is accomplished in pulses. Program control of these pulses is provided to be adaptive to a wide range of tire internal volumes and construction stiffness to minimize the time required to reach a desired pressure. In one pressure adjustment program procedure, for example, the initial air flow pulse interval is computed as a linear function of the pressure difference between the target tire pressure and the measured tire pressure. For filling this function is:

$$InitPI=[(PrDiff)(FlowIntTyp)]/(SmTire)$$

Where InitP is the initial air flow pulse interval, PrDiff is the difference between the tire pressure and the target pressure, FlowIntTyp is 1 second and SmTire is a fixed divisor chosen to produce an interval not likely to overshoot the target pressure for the smallest sized tire anticipated to be adjusted. Since the tire volume and stiffness is undetermined at this point, the initial fill pulse interval is limited to a maximum of 4 seconds to avoid safety hazards from overinflating a small or very stiff tire. Each succeeding fill pulse interval is adjusted by a computed correction factor to account for pressure adjustment system changes and the characteristics of the particular tire being adjusted in order to minimize the pressure adjustment time:

$$\text{Next Fill Interval}=(\text{Pressure Error Now})(\text{Fill Pulse Interval Last})/[(\text{Pressure Error Last})-(\text{Pressure Error Now})]$$

More elaborate adaptations are possible without deviating from the spirit of the invention. It is possible to correct for the pressure drop across the valving and connections to theoretically achieve final pressure in only one succeeding fill interval past the initial fill interval. This approach requires that the inlet pressure be measured to compute the pressure drop, to avoid overshooting the desired pressure and thus losing the time savings. Alternatively, a practical benefit may be gained without system pressure drop compensation because the resulting tire pressure following a fill interval will slightly undershoot the desired pressure. This effect diminishes with smaller pressure errors. The result is a safe filling sequence (natural undershooting rather than possible overshooting) initially and a quite rapid reaching of desired pressure shortly after, typically reaching desired pressure in only 2 total fill intervals for tires with small pressure error and 3 for larger errors. For deflating the exhaust interval is computed in the same manner as inflating except that no maximum limit is needed.

Additional adjustments to the fill and exhaust intervals are provided when the tire pressure is near the target pressure; If the differential is less than 2 psi, the interval is shortened 20% to limit the pulse magnitude. If the error is less than 0.75 psi, the system determines that the target pressure has been attained and pulse initiation is inhibited. Non-linear pulse interval and correction factor equations are also readily available, and can be derived from both empirical and theoretical considerations.

Further enhancements to the behavior of the automatic filling and deflating pulsing include; Pulse initiation is postponed until the system determines the pressure is stable at the end of a pressure registration interval. A stability threshold of below 0.1 psi/sec in pressure fluctuation minimizes delays before the pressure is read and enables compensation for the individual characteristics of hoses and tires to account for manufacturer type, ambient temperature and age. When the target pressure is being altered, pulse initiation is also inhibited. One system configuration requires only application or removal of the air hose to the tire inflation valve to begin or end the pressure adjustment feature. Tire pressure rate of change is also constantly monitored. When the pressure rate of change rises at air hose connection the inflation display, FIG. 3, appears automatically; when the pressure rate of change drops (exclusive of deflation intervals) at air hose disconnection the display returns to balance operation, FIG. 2.

A home (storage) position for the air hose is provided. An electric switch is provided to detect that the hose has been placed in its storage position to both prevent spinning of the balancer shaft when the hose is not at home position and to enable automatic initiation of pressure mode when the hose's removal from its home position is not accompanied by detection of a pressure rate rise within a selectable time period. The latter is useful when the tire has little or no initial pressure. Manual access to the pressure mode feature is also provided as well as a variety of timed delays prior to automatic initiation upon removal of the hose from its home position.

Additional features of the invention enable activation by remote communication. These communications can be by direct link or wireless, through the transfer of a data storage device or a network instruction, as well as other means well known in the art of date transfer and processing. Such remote communications can automatically initiate inflation mode upon communication inception or allow for selectable delay periods prior to initiation. Remote inflation initiation can be by direct command or by relay of information which triggers an internal initiation procedure. The remote source may receive information from the invention, conduct an analysis and return a command, or be the provider of information for the invention's analysis. The varieties of invention to remote communication interaction can trigger initiation in conjunction with further information processing for the determination of additional communications from the invention or actions to be executed by the invention. The further information processing may be conducted either by the invention or by an outside means. The entire range of invention/remote communication processes can also effect automatically any other stage of the entire range of the invention's actions in addition to initiation, as well as be in combination with direct user interaction at any individual stage, combination of stages or during the entire process. The entire range of invention/remote communication processes can also involve providing only information, notification or display to the user or a remote register of any action, state or condition, as well as in combination with executed automatic or user actions. One example of a wireless communication is receiving pressure information from a sensor that is integral to the wheel/tire assembly. Usually used to register real-time tire pressure to a vehicle's computer, the same sensor transmits the pressure information to a receiver on the wheel balancer, eliminating the requirement of gas hose attachment to the tire valve for initiation of pressure mode.

Further features of the invention for expanded range of application and improved performance are also envisioned. Internal tire temperatures can vary widely from the ambient temperature, particularly with recent vehicle operation. As is well known, the pressure of a gas is intimately related to its temperature. The program can be adapted to utilize the gas pressure vs. temperature relation to compensate when a tire's internal temperature (for example due to heating from operation) differs from the temperature referenced in a manufacturer's "cold tire pressure" specifications. The user is thus able to avoid either waiting for the tire temperature to match the specification temperature or a possibly significant later pressure error from mismatched temperatures, and can immediately proceed with pressure adjustment. The invention is not limited to the nature of the gas utilized most commonly, air, since other gasses, nitrogen for example, can also be employed. When using other gasses it is more effective to use a vacuum pump to first remove air from the tire before adding the gas. The balancer can also be configured to ensure a tire is inflated to the correct pressure by requiring pressure mode initiation and/or automatic pressure adjustment, if required, before the balancing measurement spin can commence. Another method to ensure correct tire pressure is only allowing the entry of rim dimensions for balancing determinations once the tire pressure has been checked and/or adjusted. In other embodiments the balancer, by means of notification and/or procedure steps, checks for consistent tire pressure when measuring force variation before and after rotating the tire relative to the rim to reduce wheel and tire assembly vibrations and/or also verifies consistent tire pressure across a set of wheel and tire assemblies.

Substantial functional aspects of the invention can be combined with vehicle service equipment in addition or alternative to a wheel balancer. A wheel aligner device can be combined with the pneumatic system, sensing or analysis systems, information processing, remote communication, display or notification systems or combinations thereof to enable some or all of the inflation features not directly involved with wheel balancing. Similarly, a lift rack for the raising of vehicles can also be combined with these aspects of the invention, as well as integration of pneumatic vehicle service systems and the pressure adjustment system.

What is claimed is:

1. A wheel balancer comprising:
   a shaft for receiving a wheel and tire assembly to be balanced;
   a drive for rotating the wheel and tire assembly;
   a sensor system operatively connected to the shaft for ascertaining imbalance information;
   an analysis system responsive to the imbalance information from the sensor system for determining information to correct the ascertained imbalance;
   said balancer further including a pressure sensor to read the pneumatic tire pressure of said wheel and tire assembly.

2. The wheel balancer of claim 1 wherein said balancer creates a record of the pneumatic tire pressure read from the pressure sensor.

3. The wheel balancer of claim 1 wherein the pressure sensor automatically senses the pneumatic tire pressure upon operative connection to a gas flow valve of the wheel and tire assembly.

4. The wheel balancer of claim 1 wherein the said wheel and tire assembly includes an onboard pressure sensor and transmitter and the said balancer pressure sensor receives the tire pressure information by wireless communication.

5. The wheel balancer of claim 1 wherein the balancer has a mode for determining balancing information and a mode for determining pressure information.

6. The wheel balancer of claim 5 wherein said pressure mode has a safety interlock for the prevention of onset of balancing mode.

7. The wheel balancer of claim 6 wherein said pressure mode has a safety interlock for the interruption of balancing operation upon the onset of pressure mode.

8. The wheel balancer of claim 6 wherein said pressure mode safety interlock is engaged selectively.

9. The wheel balancer of claim 8 wherein said pressure mode safety interlock is disengaged selectively.

10. The wheel balancer of claim 9 wherein said pressure mode safety interlock is disengaged by return of said gas flow valve connection to a home position.

11. The wheel balancer of claim 1 wherein said balancer is further provided with a desired tire pressure.

12. A wheel balancer as described in claim 11 wherein said balancer further includes a display for depicting the desired tire pressure.

13. A wheel balancer as described in claim 1 wherein said balancer further includes a display for depicting the pressure sensed in the wheel and tire assembly.

14. A wheel balancer as described in claim 13 wherein the display interactively operates for inputting and depicting the desired pressure and outputting and depicting both the sensed pressure and the tire pressure adjustment progress.

15. A wheel balancer and pneumatic system as described in claim 14 wherein the display device is a graphical display.

16. The wheel balancer of claim 11 wherein the desired tire pressure is manually inputted.

17. The wheel balancer of claim 16 wherein a graphical interface is utilized to manually input the desired pressure.

18. The wheel balancer of claim 11 wherein the balancer determines if the sensed tire pressure is within a reference amount of the desired tire pressure.

19. The wheel balancer of claim 11 wherein the balancer automatically determines if the sensed tire pressure is within a reference amount of the desired tire pressure upon receiving information of the tire's pressure.

20. The wheel balancer of claim 18 wherein the balancer determines a pressure differential between the sensed tire pressure and the desired tire pressure, and wherein the balancer provides a first signal when said pressure differential is greater than the reference amount.

21. The wheel balancer of claim 18 wherein the balancer determines a pressure differential between the sensed tire pressure and the desired tire pressure, and wherein the balancer provides a second signal when said pressure differential is not greater than the reference amount.

22. The wheel balancer of claim 20 further including a pressure control system operatively connected to the pressure sensing and analysis systems, said pressure control system including a source of pressurized gas and a pressure line adapted for connection to a gas flow valve of the tire.

23. The wheel balancer of claim 18 wherein the balancer, in response to sensing a tire pressure differential greater than the reference amount, automatically adjusts the tire pressure to within the reference amount of the desired pressure.

24. The wheel balancer of claim 5 wherein the wheel balancer is further provided with a desired tire pressure, said balancer thereupon determines a pressure differential equal to the difference between the sensed tire pressure and the desired tire pressure, whereupon when said balancer determines the pressure differential is greater than a reference amount the balancer automatically enters the pressure mode.

25. A wheel balancer as described in claim 23 further including an information processor responsive to the desired tire pressure and the pressure sensed in the tire and wheel assembly.

26. A wheel balancer as described in claim 25 wherein said information processor automatically determines if the sensed tire pressure is within the reference amount of the desired pressure.

27. A wheel balancer as described in claim 26 wherein the processor automatically notifies the user when said processor determines a pressure difference between the desired pressure and the sensed tire pressure greater than the reference amount.

28. A wheel balancer as described in claim 27 wherein said information processor directs the operation of said a gas flow controller.

29. A wheel balancer as described in claim 28 wherein said processor automatically directs the gas flow controller to bring the difference between the tire and wheel assembly pressure and the desired pressure to within less than the reference amount.

30. A wheel balancer as described in claim 29 wherein the processor operates according to a stored program to execute the automatic direction of the control system to correct the tire pressure.

31. A wheel balancer and information processor as described in claim 25 wherein said processor is further responsive to a remote source of data.

32. A wheel balancer and information processor as described in claim 31 wherein said remote source of data includes tire and/or gas temperature.

33. A wheel balancer and information processor as described in claim 31 wherein said remote data source is onboard the tire and wheel assembly.

34. A wheel balancer and information processor as described in claim 25 wherein said processor creates a record of the tire pressure.

35. A wheel balancer and information processor as described in claim 34 wherein the processor transmits said pressure record to a remote unit.

36. A wheel balance and information processor as described in claim 34 wherein the processor directs the making of a printout of the pressure record.

37. A wheel balancer as described in claim 1 further including a load roller disposed to apply force to said wheel and tire assembly when the assembly is mounted on the shaft.

38. A wheel balancer as described in claim 1 wherein said wheel balancer further includes a device for mounting and dismounting tires from wheels.

39. The wheel balancer of claim 1 wherein the balancer can further sense the ambient temperature and the tire's internal temperature.

40. A wheel balancer as described in claim 39 further comprising a pressure control system which can sense the ambient temperature and the tire's internal temperature upon connection of a pressure line to a gas flow valve of the tire and provide an information processor with these temperatures;
   said processor utilizing the sensed temperature information and a provided reference temperature for a target pressure to adapt the target pressure to account for differences between the reference temperature, the internal tire temperature and the ambient temperature thereby allowing immediate pressure adjustment when the internal temperature differs from the reference temperature.

41. A method for adjusting a pneumatic tire's pressure in connection with a wheel balancer for balancing a wheel and tire assembly comprising:
   attaching to the pneumatic tire's inflation valve a gas pressurization control system component of the wheel balancer;
   inputting to said pressure control system a target pressure for the tire;
   determining an initial pressure of the tire and automatically determining if the initial pressure is within a reference amount of the target pressure.

42. The method as set forth in claim 41 wherein a display is utilized to depict the target pressure and the initial pressure of the tire.

43. The method as set forth in claim 42 wherein the display is a graphic display.

44. The method as set forth in claim 41 further including notifying the user when the tire pressure differs from the target pressure by more than the reference amount.

45. The method as set forth in claim 41 further including notifying the user when the tire pressure differs from the target pressure by less than the reference amount.

46. The method as set forth in claim 41 further including directing the control system to institute the required correction to the tire pressure to bring the tire pressure within the reference amount of the target pressure.

47. The method as set forth in claim 41 further including the preliminary steps of utilizing a tire changing device for mounting a pneumatic tire on a wheel assembly and removing the wheel assembly with mounted pneumatic tire from the tire changing device before attaching the gas pressurization control system component to the pneumatic tire's inflation valve.

48. The method as set forth in claim 46 wherein an information processor operating under a stored program executes the automatic direction of the control system to correct the tire pressure.

49. The method as set forth in claim 41 wherein the user provides the target pressure.

50. The method as set forth in claim 41 wherein a remote data source provides the target pressure.

51. The method as set forth in claim 41 further including making a record of the tire pressure data.

52. The method as set forth in claim 51 further including creating a printout of said tire pressure data record.

53. The method as set forth in claim 51 further including transmitting said tire pressure data record to a remote unit.

54. The method as set forth in claim 47 further including providing an information processor with an ambient temperature, an internal temperature of the tire and a reference temperature for the target pressure upon connection of the pressure line to the tire's gas flow valve;
   said information processor utilizing the temperature information to adapt the target pressure to account for differences between the reference temperature, the internal tire temperature and the ambient temperature prior to executing automatic direction of the control system to correct the tire pressure thereby allowing pressure adjustment when the internal temperature differs from the reference temperature.

55. A wheel balancer comprising:
   a shaft for receiving a wheel and pneumatic tire assembly to be balanced;
   a drive for rotating the shaft to thereby rotate the wheel and tire assembly;
   a sensor system operatively connected to the shaft for ascertaining imbalance information;
   said wheel and tire assembly including an onboard device for registering information of at least one operating parameter, including the pneumatic tire pressure, and said wheel and tire assembly including a wireless transmitter for sending the operating parameter information;
   a wheel balancer analysis system, responsive to the imbalance information from the sensor system, for determining information to correct the ascertained imbalance;
   said wheel balancer analysis system receiving additional information from the onboard device for registering operating parameters including data reflective of the tire's actual pneumatic pressure.

56. The wheel balancer of claim 55 wherein the wheel balancer analysis system is responsive to operating parameter information from said wheel and tire onboard device including data reflective of the tire's internal temperature.

57. The wheel balancer of claim 55 wherein said balancer registers the operating parameter information from said wheel and tire onboard device, wherein the operating parameter information includes a data set recorded by said wheel and tire onboard device.

58. The wheel balancer of claim 55 wherein the balancer operates in a balance mode for the analysis of vehicle and wheel assembly imbalance information and in an additional pressure mode for the analysis of tire pressurization information.

59. The wheel balancer of claim 58 wherein the pressure mode is responsive to the onboard operating parameters data relay device's communication to determine a pressure differential function from the tire's actual pressure and the tire's optimal pressure.

60. The wheel balancer of claim 59 wherein the analysis system in either mode automatically communicates to user that the actual tire pressure is not optimal upon determining the actual pressure differs from the optimal pressure by more than a reference amount.

61. The wheel balancer of claim 60 wherein the analysis system automatically switches to the pressure mode upon determining that the actual tire pressure differs from the optimal pressure by more than the reference amount.

62. A wheel balancer comprising:

a shaft for receiving a pneumatic tire and wheel assembly to be balanced;

a drive for rotating the shaft to thereby rotate the tire and wheel assembly;

a sensor system operatively connected to the shaft for ascertaining imbalance information;

an analysis system responsive to the imbalance information from the sensor system for determining information to correct the ascertained imbalance;

a gas flow control system including a pressure sensor, a pressure source, controllers for the governing of gas flow through the control system and an operative connection for attachment to the inflation valve of an pneumatic tire;

said analysis system including at least one information processor in operational direction of the gas flow system controllers;

at least one said processor operating under at least one stored program to direct the gas flow system to adjust the pneumatic tire's pressure to within less than a reference amount of a target pressure upon operative connection to the inflation valve of the pneumatic tire.

63. The wheel balancer of claim 62 wherein said pressure adjustment occurs automatically upon attachment of the operative connection to the tire inflation valve.

64. The wheel balancer of claim 62 wherein wheel balancing operation is prevented until the tire pressure has been measured.

65. A method for adjusting a pneumatic tire's pressure in connection with a wheel balancer for balancing a wheel and tire assembly comprising:

providing a gas pressurization control system component of the wheel balancer;

determining a measured pressure of the tire and a target pressure for the tire;

said gas pressurization control system further determining if the measured pressure of the tire is within a reference amount of the target pressure.

66. The method as set forth in claim 65 wherein said gas pressurization control system automatically determines if the measured pressure of the tire is within a reference amount of the target pressure upon attaching a connection component of the gas control system to the tire's inflation valve.

* * * * *

UNITED STATES PATENT AND TRADEMARK OFFICE
CERTIFICATE OF CORRECTION

PATENT NO. : 6,293,147 B1
DATED : September 25, 2001
INVENTOR(S) : Parker et al.

It is certified that error appears in the above-identified patent and that said Letters Patent is hereby corrected as shown below:

Title page,
Inventors, replace "Creve" with -- Creve Coeur --

Column 2,
Line 30, replace "bidirectional" with -- bi-directional --

Column 4,
Lines 52, 54 and 66, replace "clement" with -- element --
Line 62, replace "MPX5700CGP" with -- MPX5700GP --

Column 5,
Line 5, replace "clement" with -- element --

Column 6,
Line 28, replace "indicate" with -- indice --

Column 11,
Line 5, replace "said a gas" with -- a gas --

Column 13,
Line 23, replace "to user" with -- to a user --

Column 14,
Line 4, replace "the" with -- an --

Signed and Sealed this

Twenty-first Day of May, 2002

*Attest:*

*Attesting Officer*

JAMES E. ROGAN
*Director of the United States Patent and Trademark Office*